(12) United States Patent
Chao et al.

(10) Patent No.: US 10,997,984 B2
(45) Date of Patent: May 4, 2021

(54) SOUNDING DEVICE, AUDIO TRANSMISSION SYSTEM, AND AUDIO ANALYSIS METHOD THEREOF

(71) Applicant: Unlimiter MFA Co., Ltd., Eden Island (SC)

(72) Inventors: Kuan-Li Chao, Taipei (TW); Kuo-Ping Yang, Taipei (TW); Neo Bob Chih-Yung Young, Taipei (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 15/905,914

(22) Filed: Feb. 27, 2018

(65) Prior Publication Data

US 2018/0254056 A1   Sep. 6, 2018

(30) Foreign Application Priority Data

Mar. 2, 2017  (TW) ................. 106106823

(51) Int. Cl.
| G10L 25/51 | (2013.01) |
| G10L 25/21 | (2013.01) |
| G10L 15/22 | (2006.01) |
| G10L 13/027 | (2013.01) |
| H04R 1/10 | (2006.01) |

(52) U.S. Cl.
CPC ............ *G10L 25/51* (2013.01); *G10L 13/027* (2013.01); *G10L 15/22* (2013.01); *H04R 1/1041* (2013.01); *G10L 25/21* (2013.01); *H04R 2430/01* (2013.01)

(58) Field of Classification Search
CPC .......... G10L 19/008; G10L 11/00; G06K 9/00

USPC .......... 704/265, 205, 207; 381/312, 314, 12
See application file for complete search history.

(56) References Cited

U.S. PATENT DOCUMENTS

| 9,311,933 | B2 * | 4/2016 | Young | G10L 25/90 |
| 9,942,667 | B2 * | 4/2018 | Ungstrup | H04R 25/554 |
| 2004/0202340 | A1 * | 10/2004 | Armstrong | H04R 25/558 |
| | | | | 381/312 |
| 2004/0260540 | A1 * | 12/2004 | Zhang | G10L 25/00 |
| | | | | 704/205 |
| 2009/0002191 | A1 * | 1/2009 | Kitaura | H04N 21/482 |
| | | | | 340/12.26 |
| 2011/0250932 | A1 * | 10/2011 | Cohen | H04R 25/505 |
| | | | | 455/569.1 |
| 2012/0310650 | A1 * | 12/2012 | Bonada | G10L 13/06 |
| | | | | 704/265 |
| 2013/0188811 | A1 * | 7/2013 | Thiede | H04R 25/50 |
| | | | | 381/312 |

(Continued)

*Primary Examiner* — Akwasi M Sarpong
(74) *Attorney, Agent, or Firm* — Bacon & Thomas, PLLC

(57) ABSTRACT

A sounding device, an audio transmission system, and an audio analysis method thereof are disclosed. The sounding device is used to establish a connection with an electronic device. The sounding device includes an output module, a data collection module, and a communication module. The output module is used to output an audio signal. The data collection module is used for collecting the audio signal to generate a sound information. The communication module is used for transmitting a notice signal to the electronic device; wherein the notice signal is generated base on the sound information. Then the communication module is used for receiving a voice signal returned from the electronic device, thus the output module is allowed to output the voice signal.

15 Claims, 4 Drawing Sheets

(56) References Cited

U.S. PATENT DOCUMENTS

| | | | |
|---|---|---|---|
| 2014/0105433 A1* | 4/2014 | Goorevich | H04R 25/554 381/312 |
| 2014/0176797 A1* | 6/2014 | Silva | H04L 12/66 348/552 |
| 2014/0270287 A1* | 9/2014 | Park | H04R 25/558 381/313 |
| 2014/0321682 A1* | 10/2014 | Kofod-Hansen | H04R 25/30 381/315 |
| 2015/0124042 A1* | 5/2015 | MacDonald | G06K 9/00335 348/14.01 |
| 2015/0125013 A1* | 5/2015 | Secall | H04R 25/554 381/315 |
| 2016/0183037 A1* | 6/2016 | Grohman | H04W 4/33 709/221 |

* cited by examiner

SOUNDING DEVICE, AUDIO TRANSMISSION SYSTEM, AND AUDIO ANALYSIS METHOD THEREOF

BACKGROUND OF THE INVENTION

1. Field of the Invention

The present invention relates to a sounding device, an audio transmission system and an audio analysis method thereof; more particularly, the present invention relates to a sounding device, an audio transmission system and an audio analysis method thereof capable of using operating capability of an external device to obtain a high definition prompt sound.

2. Description of the Related Art

With the advance of technology, utilization rates for sounding devices such as headsets and speakers are increased on a daily basis. A sounding device directly receives a sound signal transmitted from an electronic device, so as to make a sound. If the sounding device produces a sound which is too loud or has an in appropriate frequency, it would influence users' health. Meanwhile, in known prior arts, the sounding device can directly control the volume or frequency of sounds produced therefrom, therefore, the sound signal transmitted from the electronic device is not necessarily identical to the sound eventually produced by the sounding device. As a result, the electronic device would not be directly aware of values of the sound eventually produced by the sounding device. In the event of needing to know various kinds of information of audio signals being outputted in reality, the sounding device needs to carry out an analysis. However, after the sounding device carries out the analysis and needs to prompt a more advanced voice message, its outputted voice would sound artificial yet with poor quality due to insufficient operating capability and storage space of its built-in voice prompt function.

Therefore, there is a need to provide a sounding device, an audio transmission system and an audio analysis method thereof to mitigate and/or obviate the aforementioned problems.

SUMMARY OF THE INVENTION

It is an object of the present invention to provide a sounding device, which is capable of using operating capability of an external device to obtain a high definition prompt sound.

It is another object of the present invention to provide an audio transmission system for being used in the abovementioned sounding device.

It is yet another object of the present invention to provide an audio analysis method for being used in the abovementioned system.

To achieve the abovementioned objects, the sounding device of the present invention is used for establishing a connection with an electronic device. The sounding device comprises an output module, a data collection module and a communication module. The output module is used for outputting an audio signal. The data collection module is used for collecting the audio signal to generate a sound information. The communication module is electrically connected to the electronic device, so as to transmit a notice signal to the electronic device, wherein the notice signal is generated based on the sound information. Further, the communication module receives a voice signal returned from the electronic device, so as to allow the output module to output the voice signal.

The audio transmission system of the present invention comprises a sounding device and an electronic device. The sounding device comprises an output module, a data collection module and a communication module. The output module is used for outputting an audio signal. The data collection module is used for collecting the audio signal to generate a sound information. The communication module is used for transmitting a notice signal, wherein the notice signal is generated based on the sound information. The electronic device is electrically connected to the communication module, so as to receive the notice signal. The electronic device comprises a sound generation module. The sound generation module is used for generating, according to the notice signal, a voice signal for being returned to the sounding device, so as to allow the output module to output the voice signal.

The audio analysis method of the present invention comprises the following steps: collecting an audio signal for generating a sound information; transmitting a notice signal to an electronic device, wherein the notice signal is generated based on the sound information; receiving a voice signal returned from the electronic device; and outputting the voice signal.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
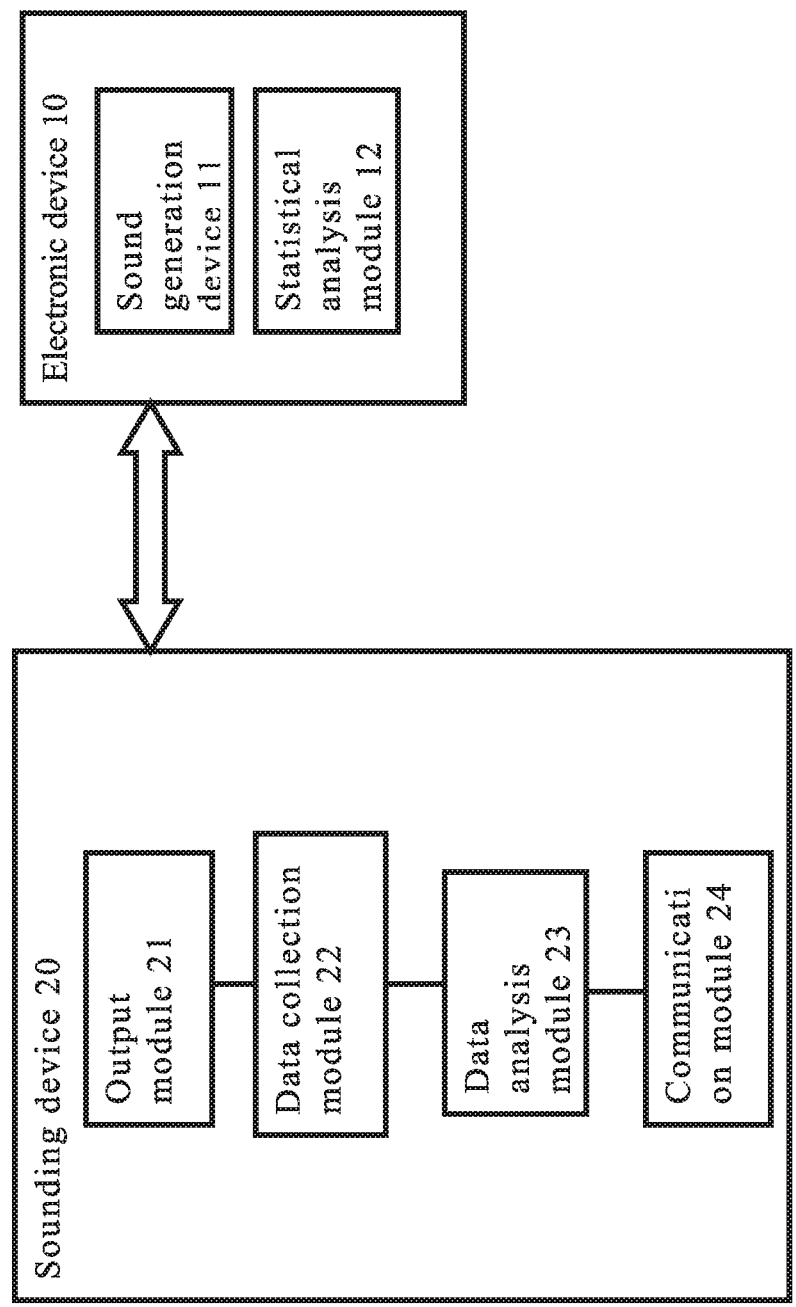
FIG. 1 illustrates a structural schematic drawing of an audio transmission system according to the present invention.

Please refer to FIG. 1, which illustrates a structural schematic drawing of an audio transmission system according to the present invention.

The audio transmission system 1 of the present invention comprises an electronic device 10 and a sounding device 20. The electronic device 10 can be, but not limited to, a desktop computer, a laptop computer, a smart phone or a tablet PC. The sounding device 20 can be an earphone, a headset or a hearing aid which is collected to the electronic device 10 in a wired or wireless way.

The electronic device 10 comprises a sound generation module 11 and a statistical analysis module 12. The sound generation module 11 can generate a high definition voice signal based on a signal obtained from the sounding device 20. This audio signal can be returned to the sounding device 20. The statistical analysis module 12 is capable of analyzing sound; as a non-limiting example, it can perform statistics and analysis to the volume, frequency and time of sound.

The sounding device 20 comprises an output module 21, a data collection module 22, a data analysis module 23 and a communication module 24. The output module 21 can be a speaker portion of an earphone, a headset or a hearing aid, and is used for outputting an audio signal. The audio signal can be obtained from the electronic device 10, or obtained form an internal storage device (not shown in figures) of the sounding device 20. However, please note the source of the audio signal is not limited to the above description. The data collection module 22 can be in a hardware circuit structure or a hardware/software associated structure, and is used for collecting the audio signal outputted via the output module 21, thereby generating sound information. The sound information may include, without limiting the scope of the present invention, the volume, frequency or time of the sound, variable coefficient statistical information (such as coefficients for noise reduction, or various coefficients for feedback cancellation) of eigenvalues or other algorithms, or non-sound information. Further, the data collection module 22 may also collect a sound recorded by a microphone.

In a first embodiment of the present invention, the data analysis module 23 is electrically connected to the data collection module 22, and is used for analyzing whether the sound information exceeds a first threshold. For example, the invention can analyze whether the volume, frequency or time of the sound, or any other coefficient exceeds a predetermined first threshold, such as determining that the audio signal is too loud, has an inappropriate frequency or is played for too long according to the sound information. For example, the invention can determine whether the audio signal exceeds 80 dB and lasts for more than 5 seconds. However, please note the scope of the present invention is not limited to the above description. If the sound information exceeds the first threshold, the data analysis module 23 would transmit an analysis signal for being used as a notice signal. Therefore, the notice signal represents a signal having a notice message code. Finally, the communication module 24 is electrically connected to the electronic device 10 in a wired or wireless way, and is used for performing mutual communications with the electronic device 10, so as to transmit the notice signal to the electronic device 10. When the electronic device 10 generates a high definition voice signal, it utilizes the communication module 24 to return the voice signal, so as to allow the output module 21 to output the voice signal, such that a user can know voice content clearly. Therefore, according to the first embodiment of the present invention, after the data analysis module 23 performs analysis and obtains the analysis signal, the communication module 24 is used for transmitting the analysis signal having the notice message code to the electronic device 10. Because the analysis signal has the notice message code, the sound generation module 11 of the electronic device 10 would accordingly generate a high definition first voice signal, and utilizes the communication module 24 to return the first voice signal, so as to allow the output module 21 to output the first voice signal, such that the user can know the voice content clearly. For example, if the signal originally outputted by the output module 21 is too loud, the clearer first voice signal generated by the sound generation module 11 of the electronic device 10 would be able to clearly inform the user about the fact that the current volume is too loud, so as to protect the user's hearing.

Further, in a second embodiment of the present invention, the analysis signal obtained by the data analysis module 23 can also be transmitted to the electronic device 10 via the communication module 24, such that the statistical analysis module 12 can perform long-term statistics and analysis to the obtained analysis signal, such as analyzing detailed value variations of the volume, frequency and time of the sound within a period of time, and further confirming whether the sound information exceeds a second threshold. For example, if the audio signal exceeds 80 dB and lasts for 5 seconds, the data analysis module 23 wound transmit the analysis signal to the electronic device 10. If the statistical analysis module 12 further analyzes that the analysis signal is accumulated to exceed the second threshold, such as the audio signal exceeding 80 dB for a certain number of times within 10 minutes, the sound generation module 11 would generate a high definition second voice signal, and utilizes the communication module 24 to return the second voice signal, so as to allow the output module 21 to output the second voice signal to inform the user.

Moreover, in a third embodiment of the present invention, the sound information obtained by the data collection module 22 can also be directly used as the notice signal for being transmitted to the electronic device 10. At this time, the statistical analysis module 12 directly analyzes the obtained sound information, such as analyzing detailed value variations of the volume, frequency or time of the sound within a period of time, and further confirming whether the sound information exceeds a third threshold. The third threshold can be equivalent to the first threshold. In the event the sound information exceeds the third threshold, the sound generation module 11 would generate a high definition third voice signal, and utilizes the communication module 24 to return the third voice signal, so as to allow the output module 21 to output the third voice signal to inform the user, thereby protecting the user's hearing.

Please note that each of the modules in the electronic device 10 and the sounding device 20 can be a hardware device, a software program combined with a hardware device, a firmware combined with a hardware device or a combination thereof without limiting the scope of the present invention. Further, the above embodiments are only preferred embodiments of the present invention. To avoid lengthy description, not all possible changes and modifications are described in full details in this disclosure, however, they still fall within the scope of the present invention. And those skilled in the related art would understand that each of the abovementioned modules or components is not necessarily essential. Further, in order to implement the present invention, other more detailed known modules or components might also be included. Each module or component can be omitted or modified according to different requirements, and other modules or components might exist between any two modules.

Figure 2:
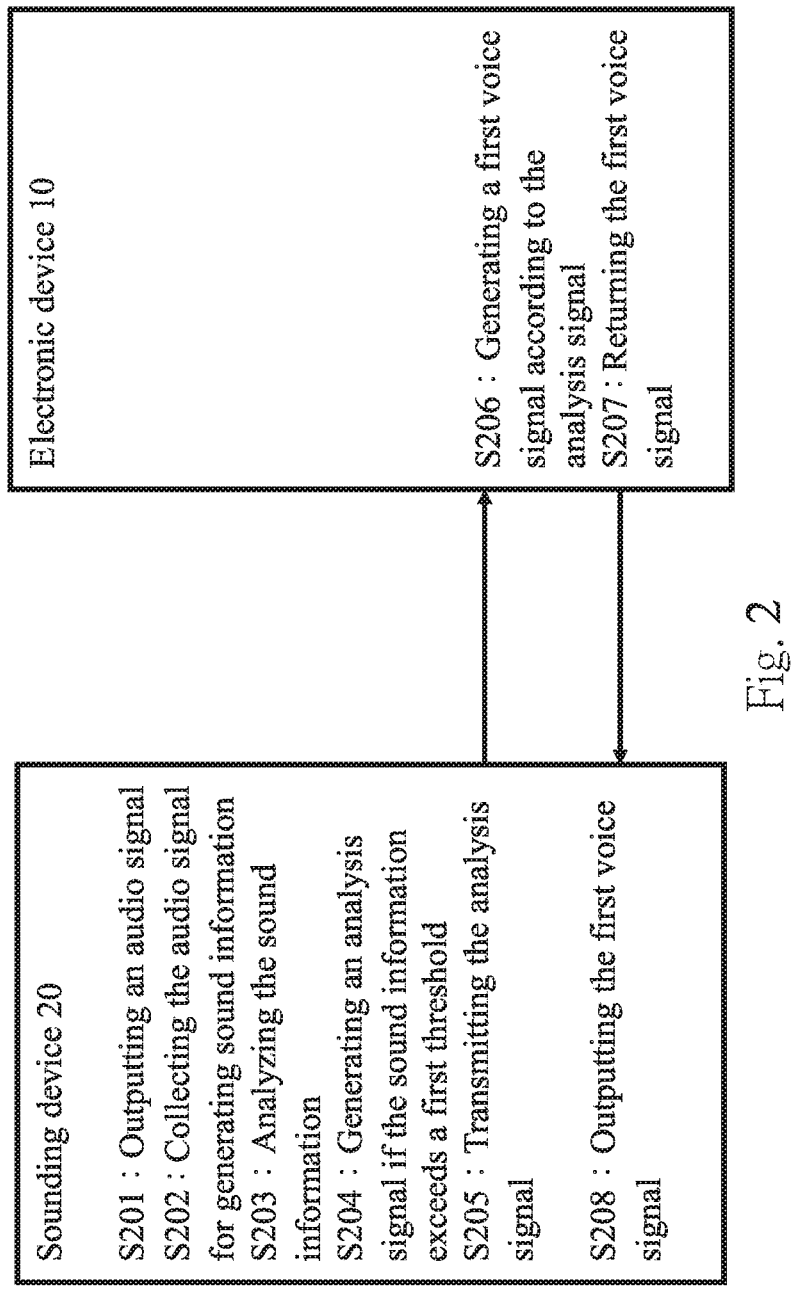
FIG. 2 illustrates a flowchart of an audio analysis method according to a first embodiment of the present invention.

Then, please refer to FIG. 2, which illustrates a flowchart of an audio analysis method according to a first embodiment of the present invention. Please note that although the above audio transmission system 1 is used as an example to explain the audio processing method of the present invention, the audio analysis method of the present invention is not limited to be implemented only in a structure identical to the above audio transmission system 1.

First, the method performs step S201: outputting an audio signal.

First, the output module 21 of the sounding device 20 outputs an audio signal.

Meanwhile, the method performs step S202: collecting the audio signal for generating sound information.

Then, the data collection module 22 is used for collecting the audio signal outputted via the output module 21, so as to generate sound information.

Next, the method performs step S203: analyzing the sound information.

At this time, the data analysis module 23 is used for analyzing and confirming whether the obtained sound information exceeds a first threshold.

Then, the method performs step S204: generating an analysis signal if the sound information exceeds a first threshold.

If the sound information exceeds the first threshold, the data analysis module 23 would generate an analysis signal for being used as a notice signal. Therefore, the analysis signal represents a signal having a notice message code.

The method further performs steps S205: transmitting the analysis signal.

After the data analysis module 23 analyzes and generates the analysis signal, the communication module 24 is used for transmitting the analysis signal to the electronic device.

And the electronic device 10 would perform step S206: generating a first voice signal according to the analysis signal.

Because the analysis signal represents a signal having a notice message code, the sound generation module 11 of the electronic device 10 would accordingly generate a high definition first voice signal.

Then, the method performs step S207: returning the first voice signal.

Then, the electronic device 10 returns the first voice signal, such that the communication module 24 can receive the returned signal.

Finally, the method performs step S208: outputting the first voice signal.

Finally, the output module 21 outputs the first voice signal, so that the user can obtain high definition voice content.

Figure 3:
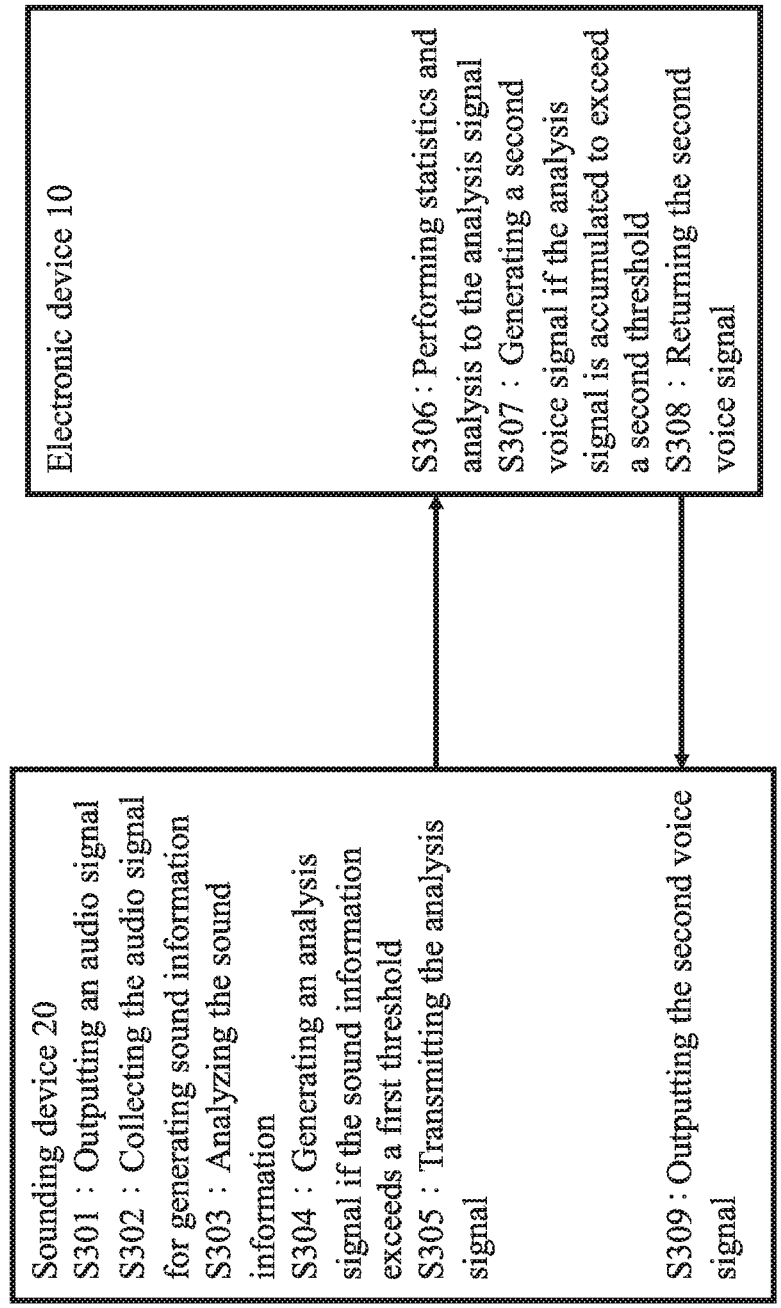
FIG. 3 illustrates a flowchart of the audio analysis method according to a second embodiment of the present invention.

Next, please refer to FIG. 3, which illustrates a flowchart of the audio analysis method according to a second embodiment of the present invention.

The method firstly performs step S301: outputting an audio signal; step S302: collecting the audio signal for generating sound information; step S303: analyzing the sound information; step S304: generating an analysis signal if the sound information exceeds a first threshold; and step S305: transmitting the analysis signal.

At first, the output module 21 of the sounding device 20 would output an audio signal. Then, the data collection module 22 is used for collecting the audio signal, so as to generate sound information. Next, the data analysis module 23 performs analysis to the sound information, and transmits an analysis signal to the electronic device 10 if the sound information exceeds a first threshold. Because the above steps S301 to S305 is equivalent to the aforementioned steps S201 to S205, there is no need for further description.

Then, the electronic device 10 performs step S306: performing statistics and analysis to the analysis signal.

The statistical analysis module 12 is used for performing long-term statistics and analysis to the obtained analysis signal.

The method further performs step S307: generating a second voice signal if the analysis signal is accumulated to exceed a second threshold. If the statistical analysis module 12 analyzes to confirm that the analysis signal is accumulated to exceed a second threshold, similarly, the sound generation module 11 would generate a high definition second voice signal.

Next, the method performs step S308: returning the second voice signal.

Then, the electronic device 10 returns the second voice signal, such that the communication module 24 can receive the returned signal.

Finally, the method performs step S309: outputting the second voice signal.

Finally, the output module 21 outputs the second voice signal, so that the user can know the voice content clearly.

Figure 4:
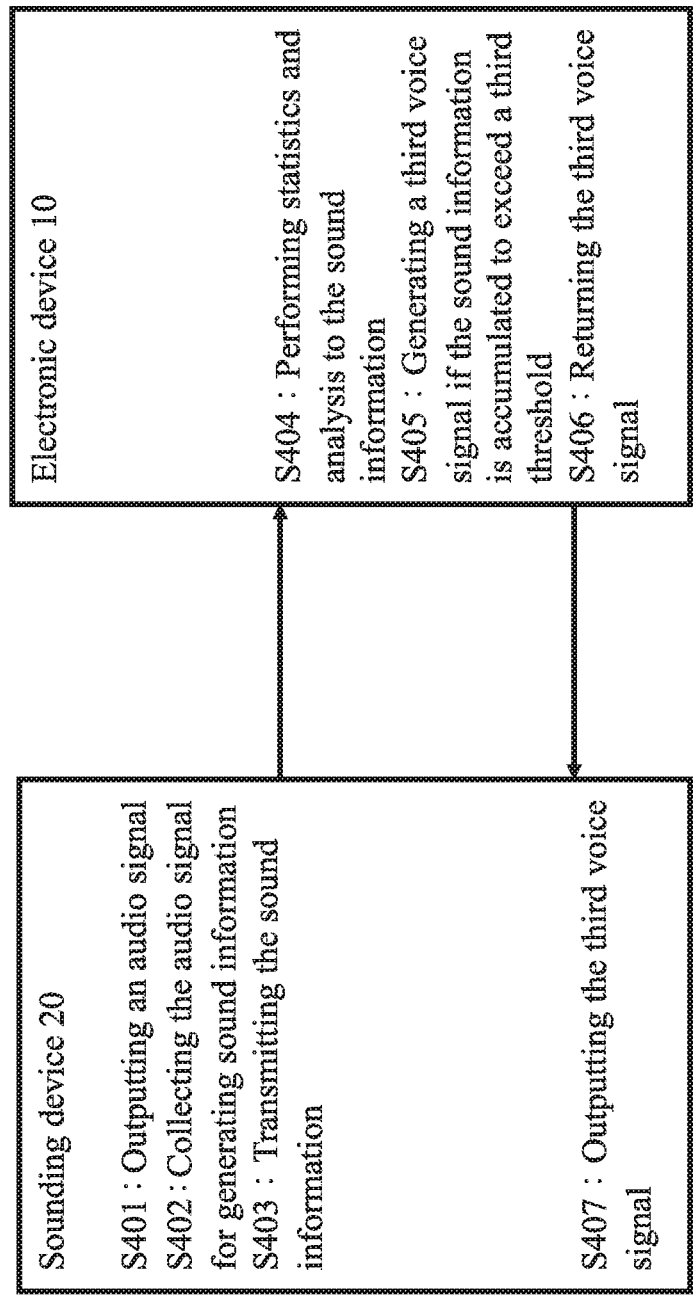
FIG. 4 illustrates a flowchart of the audio analysis method according to a third embodiment of the present invention.

Please refer to FIG. 4, which illustrates a flowchart of the audio analysis method according to a third embodiment of the present invention.

The method firstly performs step S401: outputting an audio signal; and step S402: collecting the audio signal for generating sound information.

At first, the output module 21 of the sounding device 20 would output an audio signal. Then, the data collection module 22 is used for collecting the audio signal, so as to generate sound information.

Then, the method performs step S403: transmitting the sound information.

At this time, the sound information generated by the data collection module 22 can be transmitted to the electronic device 10 via the communication module 24.

The electronic device 10 then performs step S404: performing statistics and analysis to the sound information.

That is, the statistical analysis module 12 analyzes the obtained sound information.

The method further performs step S405: generating a third voice signal if the sound information is accumulated to exceed a third threshold.

If the statistical analysis module 12 analyzes to confirm that the sound information is accumulated to exceed a third threshold, similarly, the sound generation module 11 would generate a high definition third voice signal.

Next, the method performs step S406: returning the third voice signal.

Then, the electronic device 10 returns the third voice signal, such that the communication module 24 can receive the returned signal.

Finally, the method performs step S407: outputting the third voice signal.

Finally, the output module 21 outputs the third voice signal, so that the user can know the voice content clearly.

Please note that the method of the audio analysis method of the present invention is not limited to be executed according to the abovementioned orders. The sequence of steps can be altered as long as the object of the present invention can be achieved.

As a result, when the user uses the sounding device 20, a high definition prompt sound can be immediately obtained by means of using operating capability of an external device.

Although the present invention has been explained in relation to its preferred embodiments, it is to be understood that many other possible modifications and variations can be made without departing from the spirit and scope of the invention as hereinafter claimed.

What is claimed is:

1. An earphone, used for establishing a connection with an electronic device, the earphone comprising:
an output module, used for outputting an audio signal obtained from the electronic device or from an internal storage device into a user's ear;

a data collection module, configured for collecting the audio signal outputted from the output module in the ear to generate a sound information, wherein the sound information represents a volume, frequency or time of the sound, variable coefficient statistical information of or related to the sound or non-sound information; and a communication module, electrically connected to the electronic device and configured to generate a notice signal from the sound information and transmitting the notice signal to the electronic device, and to then receive a voice signal returned from the electronic device and provide and provides the voice signal to the output module to output the voice signal;

wherein the earphone comprises a data analysis module electrically connected to the data collection module and used for analyzing the sound information, where if the sound information exceeds a first threshold, the data analysis module generates an analysis signal for being used as the notice signal;

the communication module further transmits the analysis signal to the electronic device, such that the electronic device performs statistics and analysis to the analysis signal, and accordingly a second voice signal is generated as the electronic device determines the analysis signal is accumulated to exceed a second threshold, the communication module receives the second voice signal returned from the electronic device, so as to allow the earphone to output the second voice signal via the output module.

2. The earphone as claimed in claim 1, further comprising a data analysis module electrically connected to the data collection module and used for analyzing the sound information, wherein if the sound information exceeds a first threshold, an analysis signal is generated and used as the notice signal; and the communication module further transmits the analysis signal to the electronic device for generating a first voice signal accordingly, the communication module receives the first voice signal returned from the electronic device, so as to allow the output module to output the first voice signal.

3. The earphone as claimed in claim 1, wherein the notice signal is the sound information, and the communication module further transmits the sound information to the electronic device, such that the electronic device analyzes the sound information, and accordingly a third voice signal is generated as the electronic device determines the sound information exceeds a third threshold, and the communication module receives the third voice signal returned from the electronic device, so as to allow the earphone to output the third voice signal via the output module.

4. The earphone as claimed in claim 1, wherein the audio signal includes a sound received from the electronic device, a sound recorded by a microphone or an internally-stored sound.

5. The earphone as claimed in claim 1, wherein the sound information includes a frequency, a volume or a time of the audio signal.

6. An audio transmission system, comprising:
an earphone, comprising:
an output module, used for outputting an audio signal obtained from an electronic device or from an internal storage device into a user's ear;
a data collection module, configured for collecting the audio signal outputted from the output module in the ear to generate a sound information, wherein the sound information represents a volume, frequency or time of the sound, variable coefficient statistical information of or related to the sound or non-sound information;

and a communication module configured to generate a notice signal from the sound information and to transmit the notice signal;

wherein the electronic device is electrically connected to the communication module for receiving the notice signal, the electronic device comprising: a sound generation module, used for generating a voice signal according to the notice signal for being returned to the earphone so as to allow the output module to output the voice signal;

wherein the earphone comprises a data analysis module electrically connected to the data collection module and used for analyzing the sound information, where if the sound information exceeds a first threshold, the data analysis module generates an analysis signal for being used as the notice signal; the communication module further transmits the analysis signal to the electronic device; the electronic device further comprises a statistical analysis module used for performing statistics and analysis to the analysis signal, if the statistical analysis module determines the analysis signal is accumulated to exceed a second threshold, the sound generation module accordingly generates a second voice signal for being returned to the earphone, so as to allow the earphone to output the second voice signal via the output module.

7. The audio transmission system as claimed in claim 6, wherein the earphone further comprises a data analysis module electrically connected to the data collection module and used for analyzing the sound information, where if the sound information exceeds a first threshold, an analysis signal is generated and used as the notice signal; and the communication module further transmits the analysis signal to the electronic device, such that the sound generation module accordingly generates a first voice signal for being returned to the earphone, so as to allow the earphone to output the first voice signal via the output module.

8. The audio transmission system as claimed in claim 6, wherein the notice signal is the sound information, and the communication module further transmits the sound information to the electronic device; the electronic device further comprises a statistical analysis module used for performing statistics and analysis to the sound information, if the statistical analysis module determines the sound information exceeds a third threshold, the sound generation module accordingly generates a third voice signal for being returned to the earphone, so as to allow the earphone to output the third voice signal via the output module.

9. The audio transmission system as claimed in claim 6, wherein the audio signal includes a sound received from the electronic device, a sound recorded by a microphone or an internally-stored sound.

10. The audio transmission system as claimed in claim 6, wherein the sound information includes a frequency, a volume or a time of the audio signal.

11. An audio analysis method, used in an earphone, the earphone being used for establishing a connection with an electronic device; the method comprising the following steps:
collecting an audio signal obtained from the electronic device or from an internal storage device and outputted from the earphone in a user's ear for generating a sound information, wherein the sound information represents a volume, frequency or time of the sound, variable coefficient statistical information of or related to the sound or non-sound information; transmitting a notice signal generated from the sound information to the electronic device, wherein the notice signal is generated based on the sound information; receiving a voice signal returned from the electronic device; and outputting the voice signal wherein the audio analysis further comprising the following steps: analyzing the sound information; generating an analysis signal for being used as the notice signal if the sound information exceeds a first threshold; transmitting the analysis signal to the electronic device for the electronic device to perform statistics and analysis to the analysis signal; receiving a second voice signal returned from the electronic device as the electronic device determines the analysis signal is accumulated to exceed a second threshold; and outputting the second voice signal.

12. The audio analysis method as claimed in claim 11, further comprising the following steps: analyzing the sound information; generating an analysis signal for being used as the notice signal if the sound information exceeds a first threshold; transmitting the analysis signal to the electronic device for accordingly generating a first voice signal; receiving the first voice signal returned from the electronic device; and outputting the first voice signal.

13. The audio analysis method as claimed in claim 11, wherein the notice signal is the sound information, and the method further comprises the following steps: transmitting the sound information to the electronic device for the electronic device to analyze the sound information; receiving a third voice signal returned from the electronic device as the electronic device determines the sound information exceeds a third threshold; and outputting the third voice signal.

14. The audio analysis method as claimed in claim 11, wherein the step of analyzing the sound information includes analyzing a sound received from the electronic device, a sound recorded by a microphone or an internally-stored sound.

15. The audio analysis method as claimed in claim 11, wherein the step of collecting the audio signal includes collecting a frequency, a volume or a time of the audio signal.

* * * * *